(12) United States Patent
Kuchuk-Yatsenko et al.

(10) Patent No.: US 7,802,714 B1
(45) Date of Patent: Sep. 28, 2010

(54) MACHINE FOR BUTT WELDING OF PIPES

(75) Inventors: Sergey I. Kuchuk-Yatsenko, Kiev (UA); Vladimir S. Kachinsky, Kiev (UA); Boris A. Galyan, Kiev (UA); Nikolay I. Koval, Kiev (UA); Alexander P. Miroshnichenko, Kiev (UA); Vadim Y. Ignatenko, Kiev (UA); Andrey N. Levchuk, Kiev (UA)

(73) Assignee: E.O. Paton Electric Welding Institute of the National Academy of Sciences of Ukraine, Kiev (UA)

( * ) Notice: Subject to any disclaimer, the term of this patent is extended or adjusted under 35 U.S.C. 154(b) by 0 days.

(21) Appl. No.: 12/401,678

(22) Filed: Mar. 11, 2009

(51) Int. Cl.
*B23K 37/053* (2006.01)
(52) U.S. Cl. ........................... 228/44.5; 228/213
(58) Field of Classification Search ............ 228/4.1, 228/44.3, 44.5, 212, 213
See application file for complete search history.

(56) References Cited

U.S. PATENT DOCUMENTS 6,109,503 A * 8/2000 Parker .................. 228/44.5

FOREIGN PATENT DOCUMENTS

| SU | 231041 | | 6/1968 |
|----|--------|--|--------|
| SU | 361050 | | 7/1972 |
| SU | 740436 | | 6/1980 |
| SU | 251719 | A1 | 7/1984 |

* cited by examiner

*Primary Examiner*—Jessica L Ward
*Assistant Examiner*—Megha Mehta
(74) *Attorney, Agent, or Firm*—Cesari and McKenna, LLP

(57) ABSTRACT

A machine for butt welding of pipes can be used in different branches of industry and construction when welding of tubular parts having different configurations and purposes. The machine increases the accuracy of pipe alignment during clamping and reduces frictional losses by using a special mechanism for aligning and clamping the pipes being welded. The improvement makes it possible to improve the quality of welded joints, labor productivity and reliability of machine operation.

7 Claims, 2 Drawing Sheets

MACHINE FOR BUTT WELDING OF PIPES

BACKGROUND OF THE INVENTION

1. Field of the Invention

The present invention relates to the field of butt press welding and can be used in different branches of industry and construction for the welding of tubular parts of different confgurations and for different purposes.

2. Description of the Prior Art

A machine is known for butt welding (see Author's certificate No. 740436, B.I. No. 22 of 15.06.1980), composed of movable and stationary casings, guides connecting them, upset cylinders for moving the movable casing, supports and a frame. The casings have aligning clamping mechanisms whose designs are similar. In each staple-like casing there is a staple-like semi-ring, which is rotated about the machine axis by means of hydraulic cylinders. Inside, the semi-ring has radial grooves, the center of which is located at a similar distance from the machine axis providing forces during the ring turning which act on an insert of shoes preserving the angle of force action to the insert within 10°-12°, advancing the shoes along radial slots toward the machine axis, whereby clamping and aligning of a workpiece is performed. The ring, during the reverse movement, is acting by grooves which are located on the external surface, to special rests of shoes, removing the shoes to an initial position.

There are the following drawbacks in the design of this prior machine:

1. the alignment device is designed for aligning rods and distortion and deterioration of alignment are possible when aligning pipes;
2. the staple-like casing has a low rigidity, thus leading to an increase in its weight and also deterioration of the alignment components;
3. there are large losses in the clamping drive due to the fact that the cramp-like ring is simultaneously under high friction at its external surface on the casing and at its internal surface on the shoe inserts under full force clamping, and
4. it has a complicated mechanism to return the shoes to their initial positions.

For the same reasons, there are drawbacks to the mechanism of alignment according to the Author's certificate No. 251719, B.I. No. 25 of 07.07.1984 which consists of opening casings, described also in the Author's certificate No. 740436, i.e. insufficient rigidity, large mass, high frictional losses, as the semi-rings in movement under clamping load are subjected to friction on the internal surface of the casings and on the shoe slopes by their inserts.

In the design according to the Author's certificate No. 361050, B.I. No. 1 of 1972, there are the same drawbacks that were described in earlier mechanisms of alignment, the only advantage being a large rigidity of the device, as a non-detachable circular casing is available.

A clamping aligning device for a butt welding machine is taken as a prototype according to the Author's certificate No. 231041, B.I. No. 35 of 15.11.1968, which consists of moveable and stationary casings, swinging cylinders of a ring drive which is located in the middle of the casings and aligned along the internal surfaces of the casings. Into the ring, cylindrical inserts are pressed-in, whose lateral surface projects beyond the ring internal surface and contacts during ring rotation the variable-angle slopes of clamping shoes, advancing them along radial guides in the casing to the pipes. A slope with a large angle is designed for a fast shoe feed toward the pipes, while the force necessary for generation of a clamping force is developed at a slope with a smaller angle. The shoes have a possibility of radial movement in radial slots in the casings.

In addition, in the column casings are mounted variable-arm levers which are rotated around pins fixed in the casings. One lever arm interacts with special projections of the ring, and a second arm enters the shoe slot and returns the shoe to an initial position when the ring is rotated in reverse.

Movable and stationary casings are interconnected by four guides. Moreover, at the ends of the guides, which pass through the movable casing, the pistons of a flashing and upsetting mechanism are mounted, whose cylinders are fixed on the movable casing.

As all the clamping force is imparted to the ring, then, under its action, ring deformation and an increase in its frictional force on the casing are possible. This is a considerable disadvantage of that prior design because the required drive force is increased.

Another drawback is that the machine requires a complicated mechanism for shoe return to their initial positions, and the return itself is not precise. This leads to an increase in the dimensions of casings and rings, thus increasing greatly the mass of casings.

Another large drawback is the required transition through a crest between shoe slopes with different angles. This leads to jumpy movement of the shoes and increased wear both of the ring inserts and the shoe slopes.

Besides, the repair and maintenance of the machine are complicated. For example, the replacement of a collar in a flashing and upsetting cylinder requires that the machine be dismantled.

SUMMARY OF THE INVENTION

The present invention is based on a solution to the above described problems of improving accuracy of alignment and clamping of pipes, decreasing the mass of the machine and simplifying its design. Owing to this, the quality of welding, labor productivity and reliability of the machine operation are increased.

The above problems are solved by a machine for butt welding of pipes comprising movable and stationary casings, interconnected by guides, a frame, hydraulic cylinders for flashing and upsetting, mechanisms for alignment and clamping with rings and shoes which are arranged both in the movable and stationary casings. In each casing, a clamping ring is mounted which is aligned at its inner edge to the outside diameter of casing projections so that the ring can rotate about the longitudinal axis of the machine under the action of slides contacting external projections of the clamping ring. The slides swing around pins pressed fitted into the piston rods of clamping and alignment cylinders rigidly fixed on the external cylindrical surface of the casings. The clamping ring is connected, by pins fitted into it, with corresponding first ends of shackles located in a circular groove in the inner edge of the ring. Corresponding second ends of the shackles are connected by pins to clamping shoes which are movable in radial slots in the casings toward the axis of the machine and back. Moreover, the shackles have a possibility to rotate on the pins.

The proposed design of the machine for butt welding of pipes ensures an increase in the accuracy of alignment and the clamping of pipes in that the clamping ring is aligned at its inside edge on the external diameter of projections in the casing. Consequently, ring jamming in the casing caused by its deforming from clamping forces (the ring undergoes all clamping forces) is eliminated. The use of shackles in the machine for butt welding of pipes, which are connected at one end by pins to a clamping ring, and at another end, to clamping shoes, decreases frictional losses in the aligning and clamping drive due to a decrease in angle of friction by 2-3 times as compared with the above described known prototype. In this design of a machine for butt welding of pipes, there is no special mechanism for shoe retraction into an initial position because this function is fulfilled by the above described shackles which perform clamping, and this simplifies the machine design and decreases greatly the radial dimensions of the machine and, as a consequence, its mass.

BRIEF DESCRIPTION OF THE DRAWINGS

The invention is explained by the following drawings.

DESCRIPTION OF A PREFERRED EMBODIMENT

Figure 1:
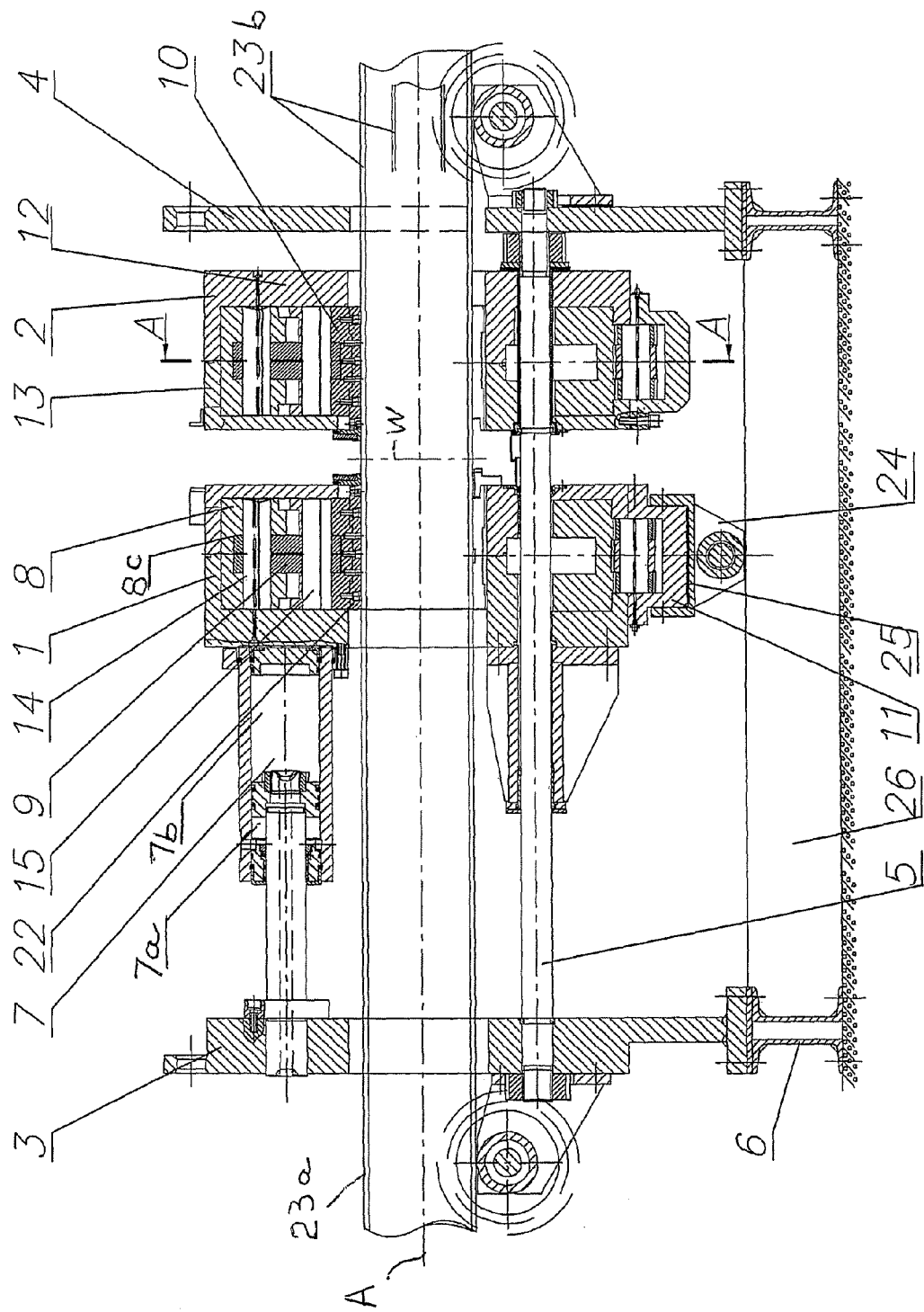
FIG. 1 shows a longitudinal section of a machine incorporating the invention.

A machine for butt welding of pipes comprises a movable casing 1, a stationary casing 2, supports 3 and 4, which are interconnected by guide rods 5 whose ends are fixed to the supports by nuts, a frame 6 supporting supports 3, 4, one or more hydraulic cylinders 7 for moving the movable casing 1 along rods 5, a pair of mechanisms 11 for pipe aligning and clamping, including clamping rings 8, shackles 9, clamping shoes 10 and hydraulic cylinders 16.

Casings 1 and 2 each consisting of two half-casings 12 and 13 assembled using bolts. In a cavity formed by the half-casings, a clamping ring 8 is arranged in grooves, the ring having external projections 8a that extend out beyond the outer diameter of the half-casings through openings. In the half-casings, radial slots S are present, in which clamping shoes 10 are arranged with an opportunity for radial movement. Clamping ring 8 is aligned for rotation about a machine axis A by sliding engagement of its inner edge with the outer diameter of projections P in the half-casings 12, 13. The inner edge of the ring is notched at 8b to provide clearance for guide rods 5 when the ring is rotated through a limited angle. In a radially inner circular groove 8c in the middle of the ring, shackles 9 are arranged. Corresponding first ends of the shackles are connected to the ring 8 by pins 14 press fitted into the ring. Shackles 9 have a possibility to swing on these pins. Corresponding second ends of the shackles are connected to clamping shoes 10 by pins 15, which are pressed fitted into the shoes so that the shackles can swing around the pins 15.

Each aligning and clamping mechanism 11 includes a hydraulic cylinder 16 fixed rigidly on the cylindrical surface of the corresponding casing 1 or 2 and with borings of different diameters at its ends in which are arranged pistons 17 (of large diameter) and 18 (of smaller diameter), interconnected by a piston rod 19 with a press fitted pin 20, on the end of which a bracket 21 is fixed, having a possibility of rotation about the pin. The bracket is connected to the corresponding ring projection 8a described above.

Shoes 10 may be equipped with changeable inserts 22 which may be replaced depending on the external diameter of the pipes 23a and 23b being welded.

In addition, on the movable casing 1 there is a roller 24 fixed on the lower mechanism 11 which is set with a gasket 25 so that the roller contacts and rolls along a beam 26 of a frame 6 as shown in FIG. 1. The thickness of gasket 25 is selected so as to compensate for the deflection of guide rods 5 under the weight of the movable and stationary casings 1, 2.

The machine operates as follows. To set the movable casing 1 into an initial or home position, a working fluid under a working pressure is supplied to a rod cavity 7a of each hydraulic upsetting cylinder 7, and a piston cavity 7b is connected to a drain. Cylinder 7, together with the movable casing 1, is moved away from casing 2 to said home position.

Figure 2:
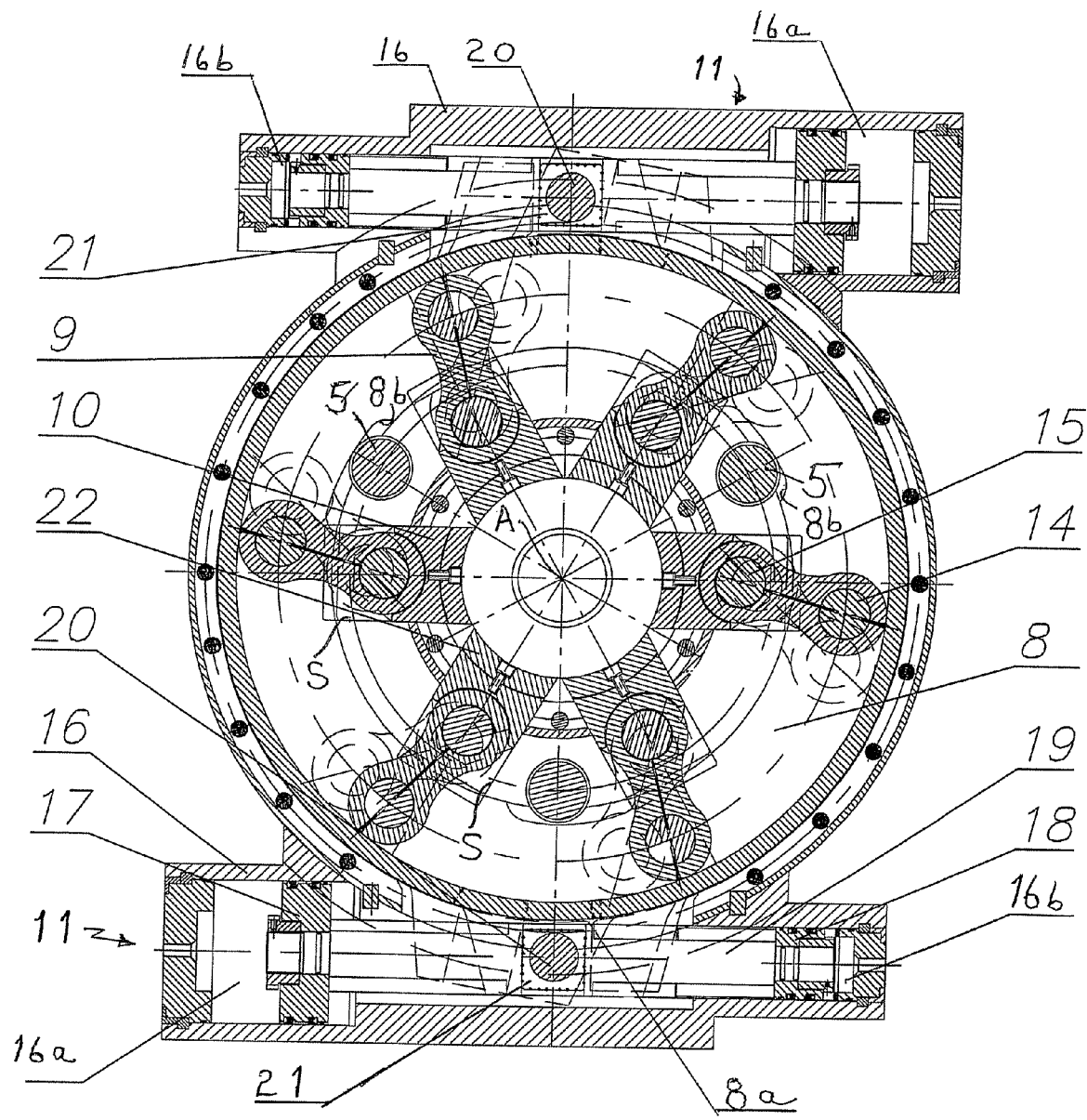
FIG. 2 is a transverse section taken along line A-A of FIG. 1.

The pipes 23a and 23b being welded are then placed into casings 1 and 2 leaving a gap between the opposing ends of the pipes. Next, a working fluid is fed into the piston cavities 16a of the hydraulic cylinders 16 of the two mechanisms 11 so that their piston rods 19 are moved. Through pins 20 and brackets 21, the rods 19 act on the clamping ring 8 so as to rotate the ring about the machine axis A counterclockwise (FIG. 2). As a result of this rotation, the clamping ring 8 through shackles 9 moves the clamping shoes 10 with the changeable inserts 22 fixed thereto toward axis A and the pipes 23a, 23b being welded. Thus, alignment and clamping of the pipes on axis A takes place.

Then, the rod cavity 7a of each hydraulic cylinder 7 is connected to a drain, and the working fluid is supplied to the piston cavity 7b. This causes the ends of the pipes being welded to be moved against one another. By connecting the piston cavity 7b of each hydraulic upsetting cylinder 7 with a drain and supplying a working fluid into rod cavity 7a, the operation of "jump away" is performed whereby the pipe ends are moved away from each other, ensuring a stable arc burning or flashing between the opposing edges of the pipes. Then, after heating of the pipes, the operation of upsetting is carried out. For this, the working fluid is supplied to the piston cavities 7b of each hydraulic upsetting cylinder 7, while the rod cavity 7a is connected to a drain. Resultantly, the pipe ends being welded are pressed together, thereby completing the weld along a weld line W shown in FIG. 2.

After welding of the pipes, the working fluid is supplied to the piston cavities 16b of hydraulic cylinders 16 of mechanisms 11 causing clockwise (FIG. 2) rotation of ring 8 so that unclamping of the welded pipes takes place. The machine is now prepared for the next welding cycle.

Application of the machine in different branches of industry allows producing high-quality welded joints owing to an increase in the accuracy of alignment and clamping of pipes, a decrease in frictional losses during alignment and clamping, a decrease in the mass of the machine and a simplifying of its design. All of these factors facilitate the operator's work, and improve labor productivity and reliability of machine operation.

What is claimed is:

1. A machine for the butt welding of pipes of the type including a stationary frame, guides supported by the frame, movable and stationary casings supported on the guides, one or more hydraulic flashing and upsetting cylinders for moving the movable casing along the guides toward and away from the stationary casing and mechanisms with rings and shoes on both of the movable and stationary casings for aligning and clamping the outsides of pipes, the improvement wherein each of said mechanisms comprises a rotatable ring, one or more casing guide surfaces slidably engaging an inner edge of the ring to align the ring for rotation about a machine axis, a plurality of radial slots in the casing distributed around and centered on said axis, a corresponding plurality of shoes movable along said slots toward and away from said axis within said ring, a corresponding plurality of shackles having corresponding first ends pivotally connected to said ring at spaced apart locations therearound and corresponding second ends pivotally connected within the ring to different ones of said shoes so that when the ring is rotated in a first direction about said axis, the shoes are moved along said slots toward said axis and when the ring is rotated in a second, opposite, direction about said axis, the shoes are moved along said slots away from said axis, and a rotating device for rotating said ring alternatively in said first and second directions.

2. The machine defined in claim 1 wherein said ring has an inner edge with a circular groove therein, and the corresponding first ends of the shackles rotate on pins spanning said groove.

3. The machine defined in claim 1 wherein the corresponding second ends of said shackles pivot on pins press fitted into the shoes.

4. The machine defined in claim 1 wherein the shoes include changeable inserts facing said axis.

5. The machine defined in claim 1 and further including a roller rotatably mounted to the movable casing which contacts a beam of said frame to prevent downward deflection of said guides.

6. The machine defined in claim 5 and further including replaceable gaskets interposed between the roller and the movable casing to adjust the spacing between the movable casing and the beam.

7. The machine defined in claim 1 wherein said rotating device comprises a double acting hydraulic actuator mounted to the associated casing, said actuator including a cylinder and a piston rod movable along the cylinder, and a link pivotally connecting the piston rod to an extension of said ring that extends through a slot in the associated casing.

* * * * *